(12) United States Patent  (10) Patent No.: US 7,398,604 B2
Murray  (45) Date of Patent: Jul. 15, 2008

(54) TAPE RULE WITH RESILIENT LOCK

(75) Inventor: John Murray, Canton, CT (US)

(73) Assignee: The Stanley Works, New Britain, CT (US)

( * ) Notice: Subject to any disclaimer, the term of this patent is extended or adjusted under 35 U.S.C. 154(b) by 12 days.

(21) Appl. No.: 11/581,072

(22) Filed: Oct. 16, 2006

(65) Prior Publication Data

US 2008/0086904 A1    Apr. 17, 2008

(51) Int. Cl.
G01B 3/10 (2006.01)
(52) U.S. Cl. ............................................ 33/767
(58) Field of Classification Search ............. 33/767
See application file for complete search history.

(56) References Cited

U.S. PATENT DOCUMENTS

| | | | | |
|---|---|---|---|---|
| 2,814,881 | A | * | 12/1957 | Ljungberg ............... 33/767 |
| 3,450,367 | A | | 6/1969 | Edgell .................. 242/107.2 |
| 4,449,302 | A | * | 5/1984 | Drechsler et al. ........... 33/767 |
| 4,516,325 | A | | 5/1985 | Cohen et al. .............. 33/138 |
| 5,001,843 | A | | 3/1991 | Chapin ................... 33/767 |
| 5,210,956 | A | | 5/1993 | Knispel et al. ............ 33/761 |
| 5,588,220 | A | | 12/1996 | Cousins et al. ............ 33/768 |
| 5,794,357 | A | | 8/1998 | Gilliam et al. ............ 33/767 |
| 5,806,202 | A | * | 9/1998 | Blackman et al. .......... 33/767 |
| 5,829,154 | A | | 11/1998 | Lin ..................... 33/767 |
| 6,226,886 | B1 | | 5/2001 | Lamond et al. ............ 33/769 |
| 6,272,764 | B1 | | 8/2001 | Lin ..................... 33/767 |
| 6,276,071 | B1 | | 8/2001 | Khachatoorian ........... 33/767 |
| 6,308,432 | B1 | | 10/2001 | Gilliam et al. ............ 33/767 |
| 6,405,451 | B1 | | 6/2002 | Hsu .................... 33/767 |
| 6,595,451 | B1 | | 7/2003 | Kang et al. ............. 242/381.2 |
| 6,928,029 | B2 | | 8/2005 | Rickman ................ 367/99 |

FOREIGN PATENT DOCUMENTS

FR 2786862 6/2000
JP 2000298002 10/2000

* cited by examiner

*Primary Examiner*—Christopher W Fulton
(74) *Attorney, Agent, or Firm*—Pillsbury Winthrop Shaw Pittman LLP

(57) ABSTRACT

One aspect of an invention disclosed herein relates to improved durability of the thumb engaging portion of a tape rule locking assembly. In accordance with this aspect, there is provided a retractable rule assembly comprising a housing assembly; a reel rotatably mounted in the housing assembly; and an elongated blade formed of a ribbon of metal being wound on the reel. The elongated blade has measuring indicia formed on a concave side thereof; and a coil spring formed of a ribbon of metal is constructed to rotate the reel in the housing assembly in a direction to wind up the elongated blade. A blade holding assembly for holding the blade in a position of extension outwardly of said housing, said blade holding assembly comprising a resilient thumb engaging portion and a receiving region behind the thumb engaging portion to enable the thumb engaging portion to deform into the receiving region to absorb impact.

30 Claims, 11 Drawing Sheets

TAPE RULE WITH RESILIENT LOCK

This invention is generally related to retractable tape rule assemblies and more particularly to rule assemblies of the spring retractable type.

BACKGROUND OF THE INVENTION

Retractable tape rule assemblies are well known in the art. For example, see U.S. Pat. No. 6,804,899, hereby incorporated by reference. There is a constant need in the tool industry for tape measures with improved utility and durability.

BRIEF DESCRIPTION OF THE INVENTION

One aspect of an invention disclosed herein relates to improved durability of the thumb engaging portion of a tape rule locking assembly. In accordance with this aspect, there is provided a retractable rule assembly comprising a housing assembly; a reel rotatably mounted in the housing assembly; and an elongated blade formed of a ribbon of metal being wound on the reel. The elongated blade has measuring indicia formed on a concave side thereof; and a coil spring formed of a ribbon of metal is constructed to rotate the reel in the housing assembly in a direction to wind up the elongated blade. A blade holding assembly for holding the blade in a position of extension outwardly of said housing, said blade holding assembly comprising a resilient thumb engaging portion and a receiving region behind the thumb engaging portion to enable the thumb engaging portion to deform into the receiving region to absorb impact.

Another aspect of an invention disclosed herein relates to a blade locking structure for a rule assembly, comprising a generally arcuate body portion comprising a plastic material; and a thumb engaging portion joined with the body portion. The thumb engaging portion comprises an elastomeric material, and a receiving region behind the thumb engaging portion.

Another aspect of an invention disclosed herein relates to a blade holding assembly for a rule assembly, comprising a thumb engaging portion and a blade engaging portion. The blade engaging portion comprises a resilient structure for engaging a blade.

These and other objectives, features, and advantages of the present invention will become apparent from the following detailed description, the accompanying drawings, and the appended claims.

DETAILED DESCRIPTION OF THE INVENTION

Figure 1:
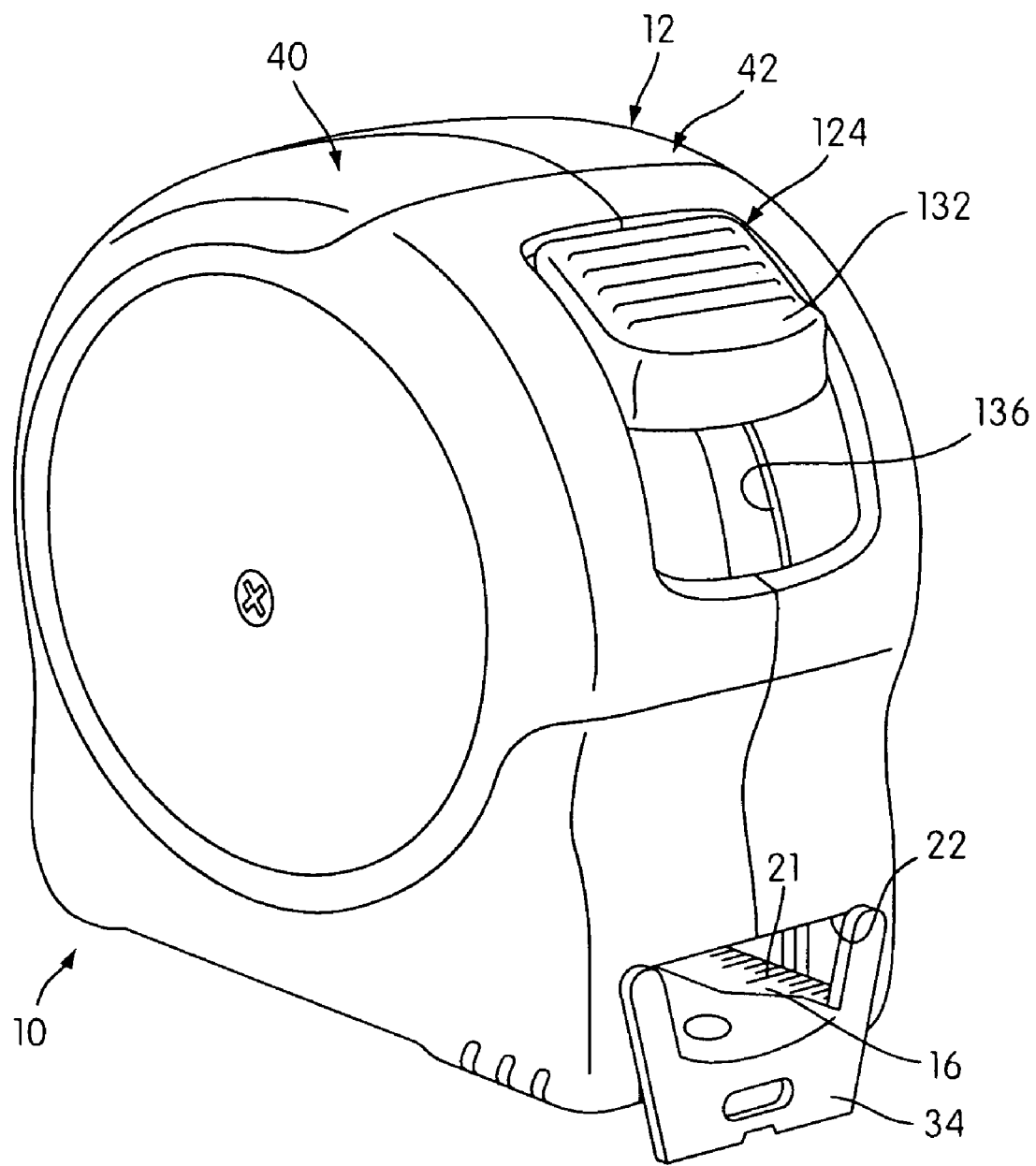
FIG. 1 shows a prospective few of a tape rule assembly constructed according to the principles of the present invention.
Figure 2:
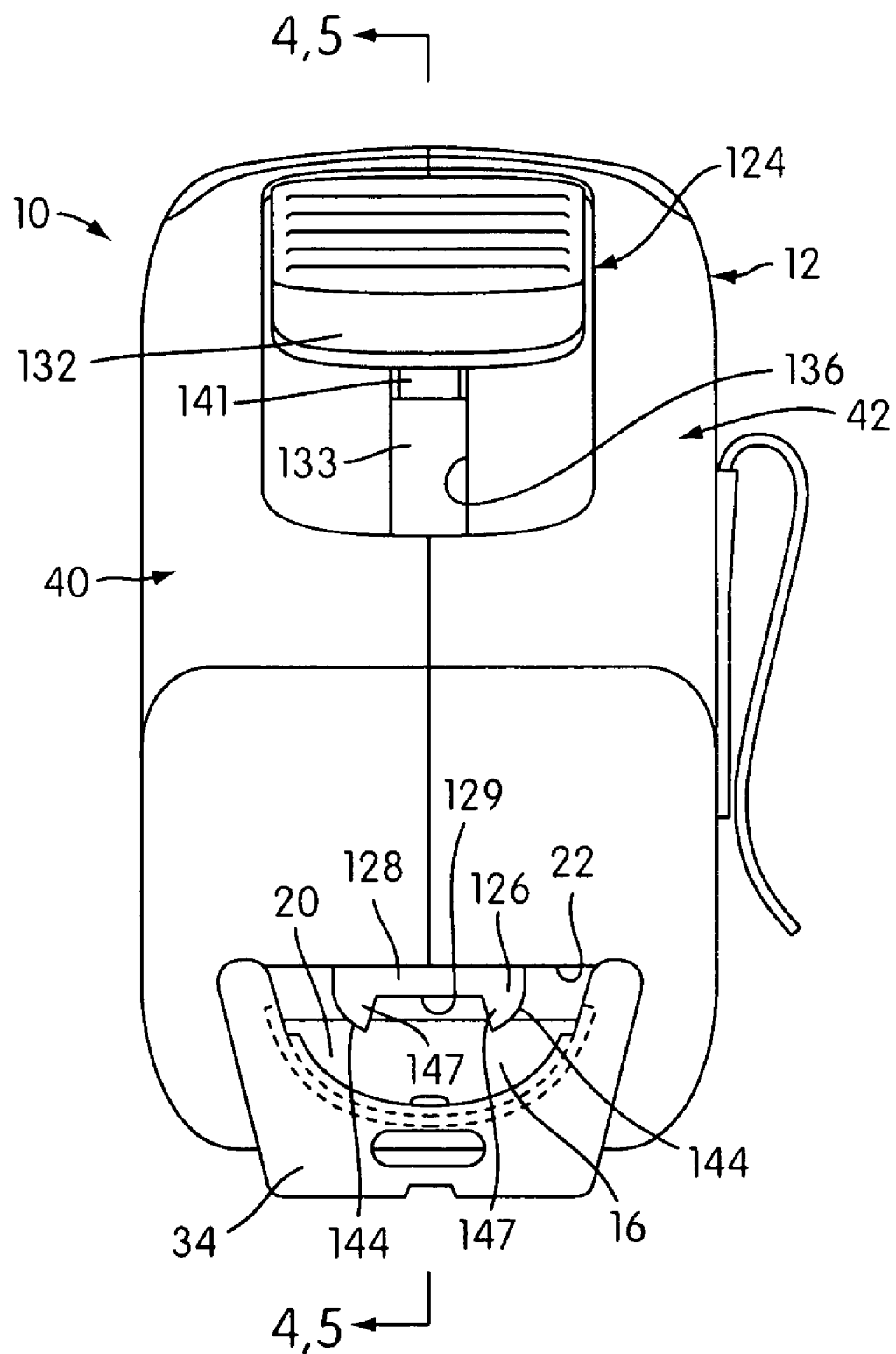
FIG. 2 shows a front of elevational view of the tape rule assembly.
Figure 3:
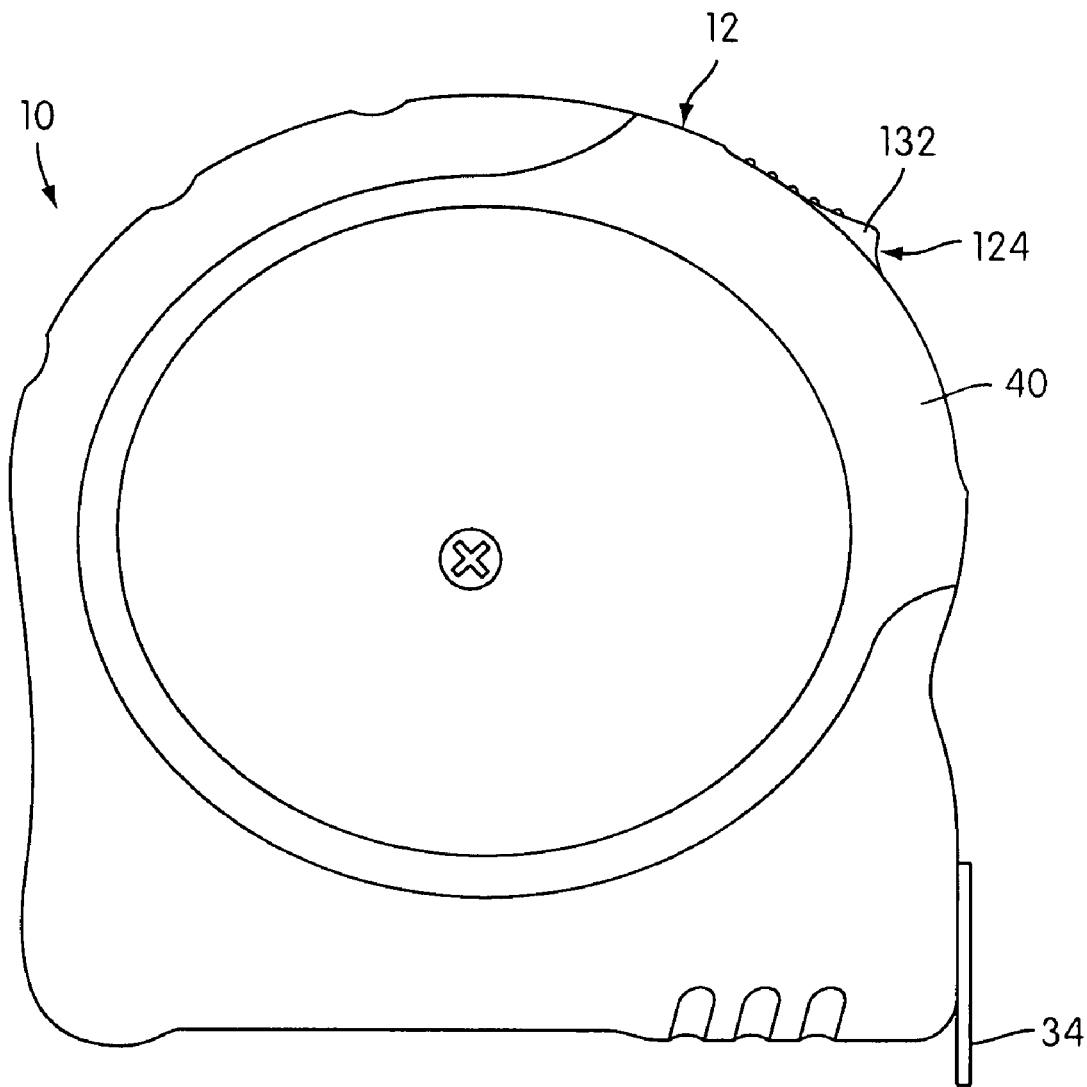
FIG. 3 shows a side of elevational view of the tape rule assembly.
Figure 4:
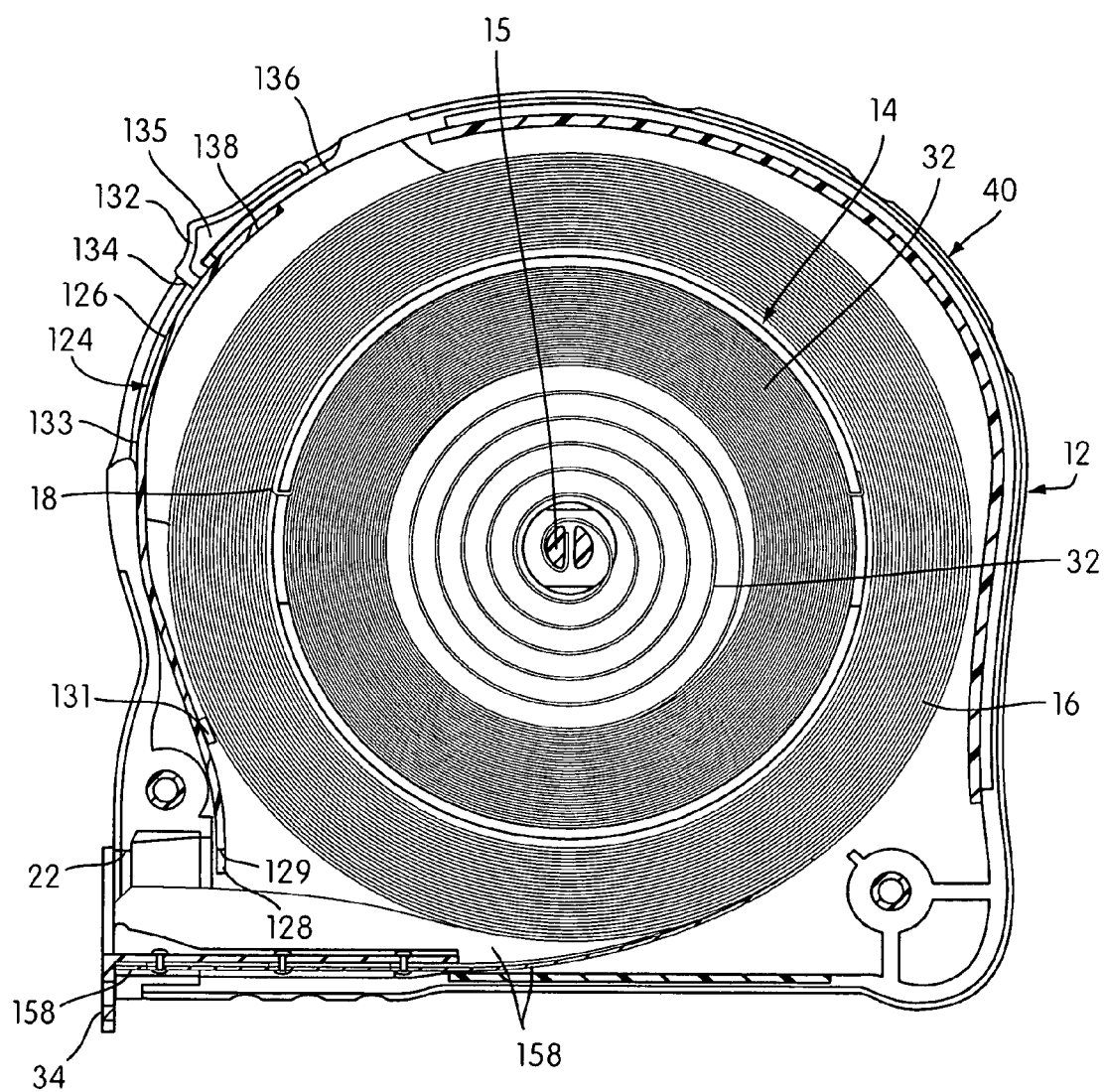
FIG. 4 shows a cross-sectional view of the tape rule assembly taken through the line 4-4 in FIG. 2 showing a blade thereof in a fully retracted configuration.
Figure 5:
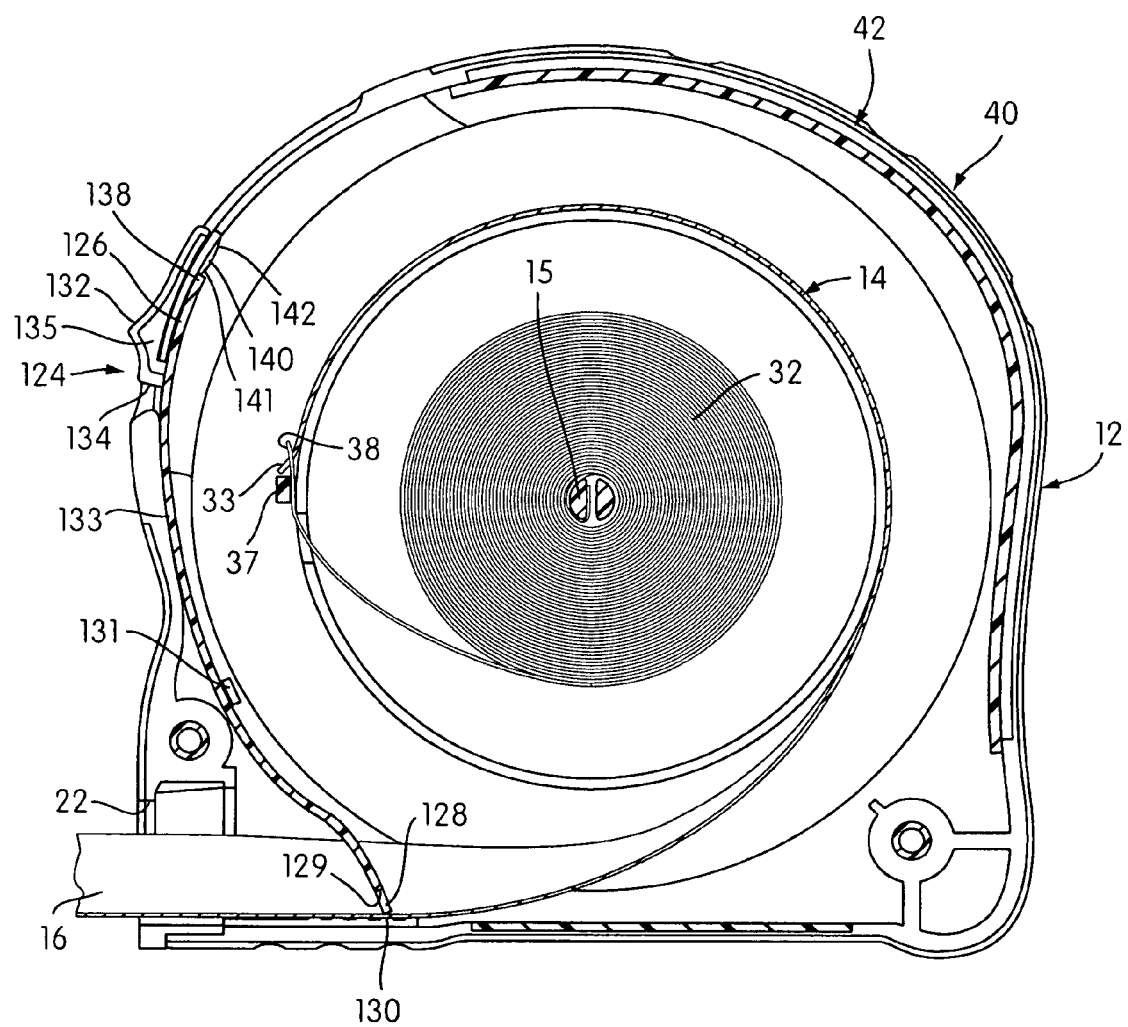
FIG. 5 is a view similar to FIG. 4 except showing the blade in a fully extended configuration.

FIGS. 1-3 show an exterior view of a retractable rule assembly that is generally designated 10 and is constructed according to the principles of the present invention. The rule assembly 10 includes a housing assembly 12 and a reel 14 that is rotatably mounted inside the housing assembly 12 (best seen in the cross-sectional views of FIGS. 4-5). The reel 14 is mounted in the housing assembly 12 by a reel spindle 15 that is secured within the housing assembly 12 (FIGS. 4-5). An elongated tape rule blade 16 is mounted on the reel 14.

The blade 16 is formed of a ribbon of metal, the preferred metal being steel, and the top concave surface of the blade is printed with measuring indicia, such as lines and digits (not shown) for measuring lengths and distances. One longitudinal end 18 of the blade 16 is connected to the reel 14 and a second longitudinal free end 20 of the blade 16 extends generally outwardly of the reel 14 (see FIGS. 4 and 5c). The blade 16 is constructed and arranged with respect to the housing assembly 12 to extend generally from a position tangential of the reel 14 outwardly through a spaced opening 22 provided in the housing assembly 12 (as shown, for example, in FIG. 4).

Preferably the reel 14 is made of a molded plastic. The blade 16 is wrapped around the reel and has a proximal end thereof fixed relative to the reel 14 for rotation therewith.

A coil spring 32 has an interconnection between the housing assembly 12 and the reel 14 to rotate the reel 14 with respect to the housing assembly 12 in a direction to wind the elongated blade 16 about the reel when the blade 16 is extending outwardly of the housing assembly opening 22. In one embodiment, as best seen in FIG. 5, the blade 16 is connected to the reel 14 by virtue of the beginning end (distal end) 33 of the blade within the housing being connected to a terminal end 38 of the spring 32 in a conventional, known manner with the spring 32 having a portion thereof (adjacent the connection with the blade 16) being pinned, clipped by protruding reel portion 37 to an outer periphery of the reel 14. Preferably the spring 32 is a thin, flat ribbon of metal, such as steel.

The blade 16 is generally movable between a fully retracted position outwardly of the housing assembly 12 to a fully extended position. The fully retracted position of the blade 16 is shown in FIG. 4 and the fully extended position of the blade is shown (in fragmentary view) in FIG. 5. It can be appreciated from a comparison of FIG. 4 and FIG. 5 that as the blade is unwound from the reel 14, the coil spring 32 is wound around the rigidly fixed spindle 15. This winding of the spring around the spindle stores energy in the spring to provide spring powered rewinding of the blade 16 around the reel 14 when the extended blade is released.

Figure 5A:
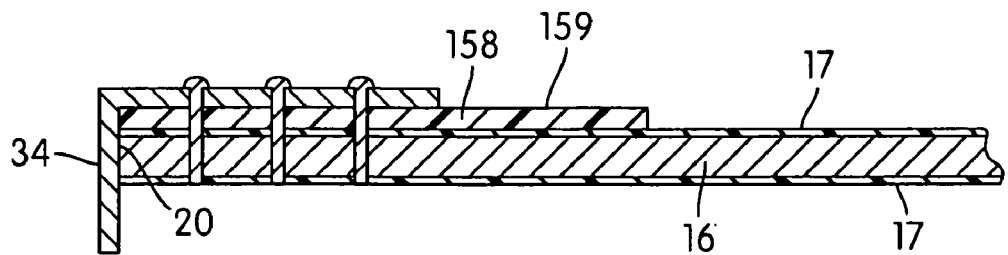
FIGS. 5a-c show three cross sections of configurations of the blade with a film of plastic material on the concave and convex sides, respectively.

The blade 16 is constructed of a ribbon of sheet metal that is shaped during the manufacturing to have a normal or memory configuration that has a generally arcuate or concave-convex transverse cross-section. The blade 16 has a layer of paint on both sides thereof, with the paint on the concave side of the blade 16 providing measuring indicia 21. In one embodiment, yellow paint is used for background, with black paint on top of the yellow for the numbers and gradations on the top of the blade. However, any combination of colors may be used. The paint layer on each side of the blade preferably has a thickness of about 0.0001"-0.0014", more preferably between 0.0006"-0.0012", and more preferably between 0.0008"-0.0010." A water-based paint or solvent-based paint is preferred. The "paint" as referred to herein is also sometimes referred to in the art as "ink." In order to reduce damage to the paint layer from rust, corrosion and wear, the paint layer on both sides of the entire blade length is coated with a thin, clear plastic protective coating 17 as shown in FIG. 5*a*. One such coating may employ materials as described in U.S. Pat. No. 3,121,957, hereby incorporated by reference. The thin plastic coating 17 is preferably provided throughout the length of the blade and on both sides of the blade, with each side of the blade having a coating thickness of less than 0.004", and more preferably between about 0.002" and about 0.003". Any appropriate flexible or semi-flexible material may be used, but Mylar, Polyester, Nylon, Lacquer or Acrylic are most preferred. The material of coating 17 can be of a film type, or of a curable liquid type. In addition, an appropriate thermoset, rubber, thermoplastic, thermoplastic elastomer, polyamide, polyvinyl, silicone, polyimide, polyethylene, fluoropolymer, polyurethane or polyethylene terephthalate may be also used, for example. The coating 17 provides a wear-resistant layer that reduces or inhibits wear of the indicia on the blade. It also preferably provides a sealing function to inhibit rust formation on the blade. If the plastic coating 17 is omitted, it is preferable to use a wear resistant paint to provide the measuring indicia.

In accordance with one aspect of the present invention, the coating 17 provided on the top or upper portion of the blade (that covers the measuring indicia and numerals) has a fluorescent dye or material additive mixed therein. The fluorescent dye within the coating 17 retains the translucency (or transparency) of the coating so that the painted indicia thereebeneath on the paint layer can be clearly viewed. The fluorescent coating applied over the printed tape measure blade graphics, numbers and measuring graduation improves the ease of identification and readability of such blade graphics, particularly in dimly lit conditions. The top coating 17 creates contrast and illumination that also provides improved readability in brightly lit conditions.

In one embodiment, the coating 17 has a thickness of between about 0.0002" to 0.010".

As used herein, the term "translucent" as used herein is meant to broadly encompass transparent, clear, and light diffusing, but such that indicia or other markings therebehind can be viewed.

In another embodiment, the coating 17 on both the top and bottom of the blade are provided with the fluorescent additive.

When a portion of the normally concavo-convex cross-sectional blade 16 is wound about the reel 14, the wound portion has a flattened transverse cross-section and the wound layers of the coiled blade provide the wound blade with an abutting volute coil configuration. It can therefore be understood, that when the blade 16 is wound around the reel 14, it has a flat cross-section and when the blade 16 is withdrawn from the housing assembly 12 to measure an object, it returns to the concavo-convex cross-section. For an example, see U.S. Pat. No. 6,804,899, which has been incorporated by reference. The coil spring 32 is constructed and arranged between the housing assembly 12 and the reel 14 to rotate the reel 14 about the spindle with respect to the housing assembly 12 in a direction to wind up the elongated blade 16 into the housing when extending outwardly of the housing assembly opening 22 in a normal concavo-convex cross-sectional configuration onto the reel 14 in an abutting volute coil formation in a flattened cross-sectional configuration. The concavo-convex cross-section provides the extended blade with rigidity and maintains the blade essentially straight in the longitudinal direction.

A holding assembly, generally designated to 124, is constructed and arranged to be manually actuated to hold the blade 16 in any position of extension outwardly of the housing assembly opening 22 and to release the blade 16 from any position in which it is held. The structure and operation of the holding assembly 124 is best appreciated from a comparison of FIGS. 4-5. The holding assembly 124 includes a holding member 126 mounted on the housing assembly 12 for movement in opposite directions between a normally inoperative position (FIG. 4) and a holding position (FIG. 5). It can be appreciated that the blade holding member 126 is a generally arcuate member that is movable along an arcuate path between the two positions as aforesaid. The holding member 126 has an interior free end portion 128 that is movable into wedging engagement with the tangentially extending portion of the blade 16 to engage and hold the blade against an interior holding structure 130 (FIG. 5) on the housing assembly 12 when the holding member 126 is in its holding position. The free end portion 128 includes a central recess 129 (FIG. 2, for example) that is described in detail below. The holding member 126 has an exterior thumb engaging portion 132 configured to be moved digitally to selectively move the holding member 126 from its normally inoperative position and its holding position. The exterior thumb engaging portion 132 is best seen in FIGS. 1-2.

Figure 6:
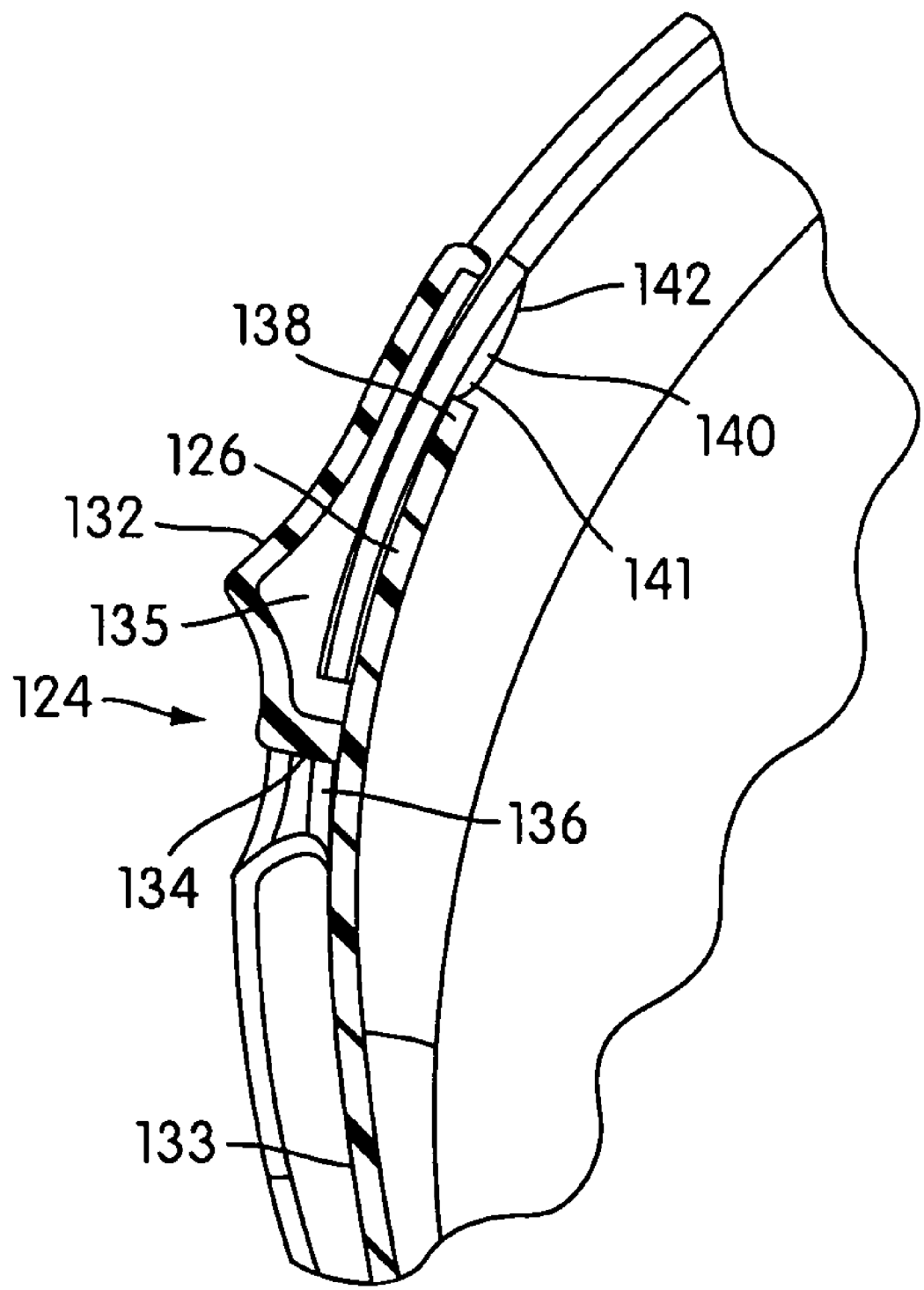
FIG. 6 is an enlarged sectional view of a portion of FIG. 5, so as to more clearly illustrate the thumb engaging portion.
Figure 10A:
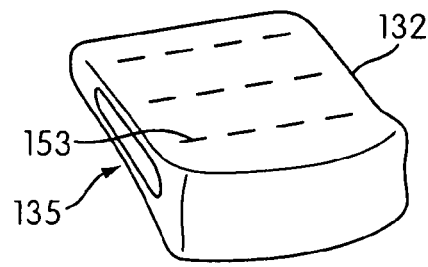
FIG. 10a-d are various embodiments of thumb engaging portions in accordance with various aspects of the inventions disclosed herein.
Figure 10B:
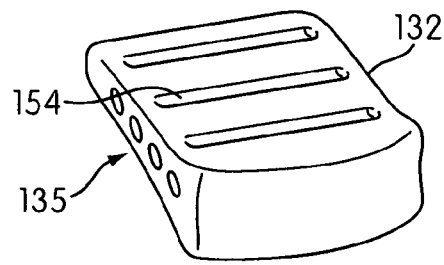
Figure 10C:
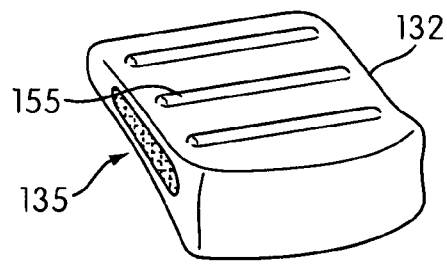
Figure 10D:
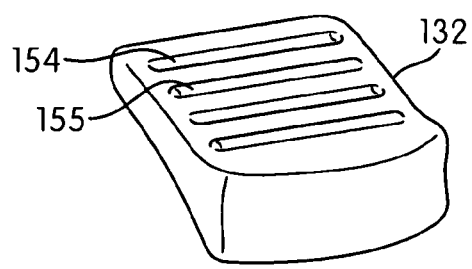

In one embodiment, the thumb engaging portion or slide button 132 is constructed to be impact resistant. Specifically, as best seen in FIG. 6, thumb engaging portion 132, in one embodiment is made from a flexible or elastic material, such as a compliant flexible rubber or thermoplastic elastomer "TPE." In one embodiment, the thumb engaging portion 132 exterior surface has perforations 153, as illustrated in FIG. 10*a*. In another embodiment, the thumb engaging portion 132 exterior surface has either recessed grooves 154, protruding grooves (protrusions) 155, or a combination of both to bias the direction the outer surface deformation upon impact as illustrated in FIGS. 10*b*-10*d*. In another embodiment, the thumb engaging portion 132 exterior surface has a non-uniform cross-sectional thickness to facilitate movement of the holding member 126 in the arcuate actuation direction. This also allows the thumb engaging portion 132 to yield in a perpendicular direction or the direction of the impact.

As seen in FIGS. 5 and 6-9*e*, the thumb engaging portion 132 is connected to an elongated arcuate flexible body portion 133 that terminates in the interior free end 128. The body portion 133 is made from an appropriate durable flexible plastic. The body portion 133 may be a one-piece molded structure, or may be a plurality of pieces connected together in any suitable manner.

The connection 139 between the thumb engaging portion 132 and the body portion 133 can be achieved by an adhesive connection, a welding operation, or a co-molding operation. In one embodiment, the connection 139 is a chemical polymer bond. In another embodiment, the connection 139 is an adhesive bond. In another embodiment, the connection 139 is a mechanical bond. In another embodiment, the connection 139 is a friction fit. In another embodiment, the connection 139 is integrally formed in a co-molding or sequential molding operation with the body portion 133 and thumb engaging portion 132. As illustrated in the enlarged partial view of FIG.

6, a receiving region 135 is provided behind the thumb engaging portion 132. This gap or void allows the flexible thumb engaging portion 132 to deform into the receiving region 135 and thereby absorb and deflect the drop impact energy in the event that the rule assembly 10 is dropped and the portion 132 impacts the ground or other surface. In one embodiment, the receiving region 135 may comprise a void or space. Following the impact and resultant deformation, the thumb engaging portion 132 flexes back to its original form. As a result, the structural integrity of the thumb engaging portion 132 is preserved, as it will not fracture upon impact. The outwardly extending portion 134 is slidably held within and guided by a slot 136 (see FIG. 2) formed within a front part of housing assembly 12 by the members 40, 42. The movement of a lower portion of the holding member 126 is guided by a pair of tabs 131 integrally formed on respective housing members 40, 42 (only one tab is shown in the figures). An integral locking structure 138 on the holding member 126 engages holding structure 140 (FIG. 5) integrally formed on the housing assembly 12 to releasably lock the holding member 126 in the holding position in wedging engagement with the blade 16.

In one embodiment, the thumb engaging portion 132 deforms a distance that is greater than 50% of the cross-sectional thickness thereof, wherein the thickness measurement is taken at a region of maximum cross-sectional thickness for a portion of the thumb engaging portion 132 that flexes toward the receiving region 135.

Figure 7A:
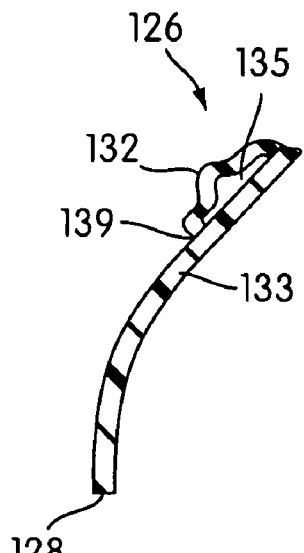
FIGS. 7a-7d are various embodiments of holding members in accordance with various aspects of the inventions disclosed herein.
Figure 7B:
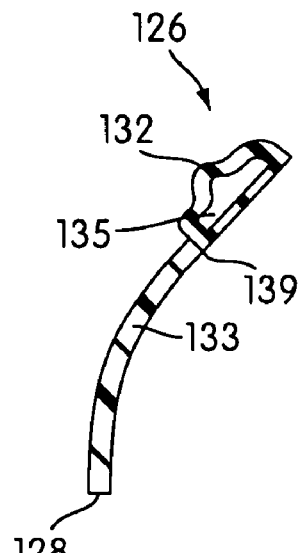
Figure 7C:
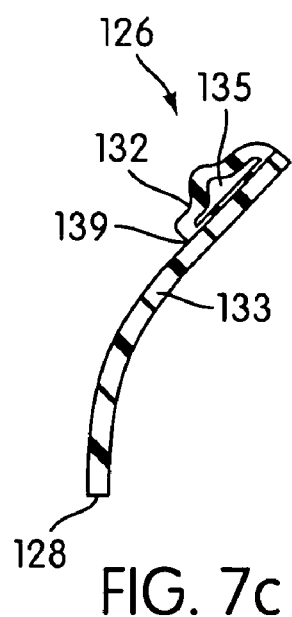
Figure 7D:
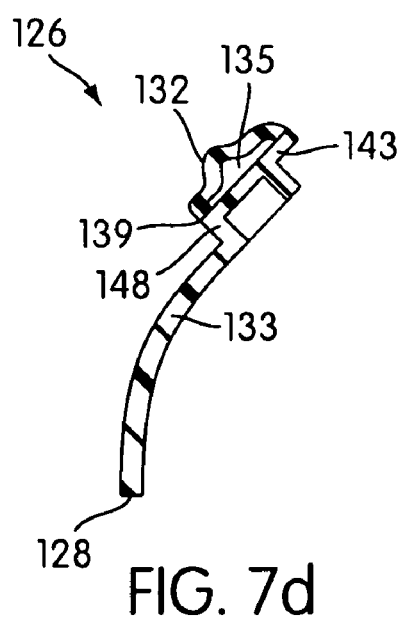

FIGS. 7a-7d illustrate various, non-limiting arrangements for the body portion 133 and thumb engaging portion 132 joined therewith at connection 139. In FIG. 7a, the void 135 is formed between the thumb engaging portion 132 and body portion 133, by having the ends of the thumb engaging portion joined at connection 139 with the body portion 133 as illustrated. In the embodiment of FIG. 7b, the void 135 is formed entirely within the resilient material of the thumb engaging portion 132, which has an exterior end surface thereof joined with the body portion 133, as illustrated. FIG. 7c is similar to FIG. 7b, with the void 135 formed entirely within the thumb engaging portion 132, but has an exterior bottom surface thereof joined with the body portion 133. FIG. 7d illustrates an arrangement wherein the body portion 133 has an outwardly extending neck portion 148 to accommodate the side edges defining slot 136 in the housing (see FIG. 2) as known in the art. As shown, in FIG. 7d, the neck portion 148 joins with a mounting portion 143 to which the thumb engaging portion 132 is joined.

Figure 8A:
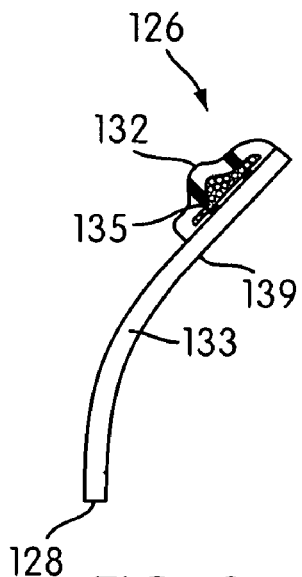
FIGS. 8a-8d are additional embodiments of holding members in accordance with various aspects of the inventions disclosed herein.
Figure 8B:
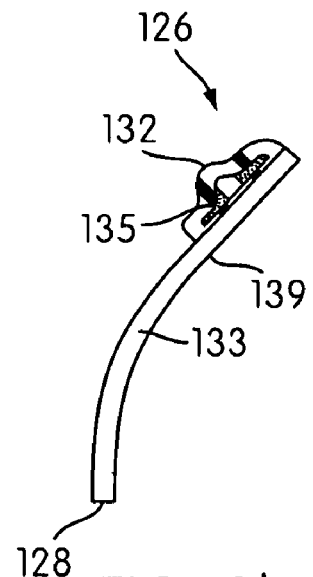
Figure 8C:
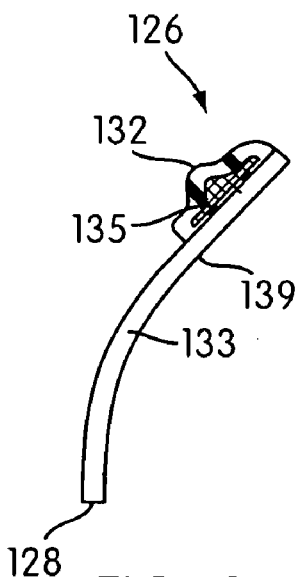
Figure 8D:
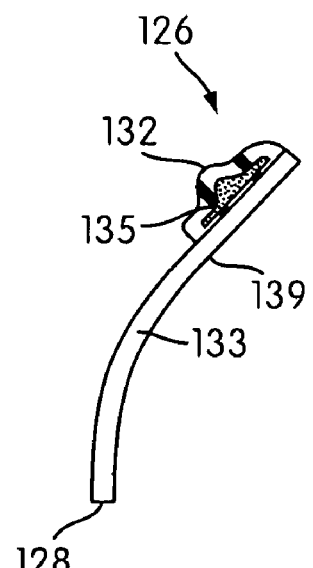

In one embodiment, the receiving region 135 is comprised of a thru void as seen in FIG. 10a. As shown, the thru void is generally empty and the void is open on either side. In another embodiment, the receiving region 135 is comprised of a plurality of voids, as seen in FIG. 10b. In another embodiment, the void 135 is entirely enclosed within the thumb engaging portion, as can be appreciated from FIG. 10d. In another embodiment, the receiving region 135 is not a void, but rather comprises a gel, foam, or other material that is of a lower durometer, or a more compliant material than the thumb engaging portion 132, as can be appreciated from FIGS. 8a, 8c and 10c. FIG. 8a illustrates the receiving region 135 comprising a cellular type material. FIG. 8c illustrates the receiving region 135 comprising a gel material. FIGS. 8b and 10c illustrate the receiving region 135 comprising a foam material, which foam material is of a different color than the thumb engaging portion 132, as discussed below. In these embodiments, the receiving region comprise a relatively softer material than that of the resilient thumb engaging portion 132 to allow the thumb engaging portion 132 to deform into the receiving region 135 upon impact. As discussed above, in some embodiments, the receiving region 135 comprises a material of a different color than the thumb engaging portion 132, and can be viewed from a side profile of the device to provide the holding member 126 with a distinctive look, as illustrated in FIG. 10c. For example, in one embodiment, the thumb engaging portion 132 is a black resilient material, and the receiving region 135 comprises a yellow resilient material of lower durometer (e.g., foam or gel), as illustrated in FIG. 10c. In another embodiment, the receiving region 135 is a cellular structure, as seen in FIG. 8a. The cellular structure of the receiving region 135 is of a different (softer durometer) material than the thumb engaging portion 132 and of the holding member 126. However, in one embodiment, the receiving region is of the same material, but a foamed version of a non-foamed thumb engaging portion 132. This facilitates bonding between these materials. In another embodiment, they are of different materials.

To lock the blade 16 in a given position of extension, as known in the art, the user (while holding the blade 16 outwardly of the housing assembly 12 against the spring force of the coil spring 32) slides the thumb engaging portion 132 downwardly with respective to the housing assembly 12 causing the locking structure 138 to slide over a ramped surface 142 on the holding structure 140 and causing the free end or blade engaging portion 128 to move in a locking direction with respect to the blade 16. The flexible plastic locking structure 138 bends resiliently inwardly slightly as it passes over the holding structure 140. After the free end 128 contacts the blade 16, continued movement of the thumb engaging portion 132 in the locking (downward) direction thereafter wedges the free end 128 of the flexible body portion 133 against blade 16 to hold the blade 16 in place against the spring force of the coil spring 32 and moves the locking structure 138 into abutting engagement with a locking surface 141 on the holding structure 140. The holding member flexes slightly as the free end 128 is wedged against the blade 16. The abutting engagement between the locking structure 138 and the locking surface 141 locks the holding member 126 in its holding position.

It can be understood from FIG. 5 that the blade 16 is held in an extended position (against the spring force of the coil spring 32) between the free end 128 of the body portion 133 and the interior holding structure 130 by the downward force exerted by the wedged body portion 133. The interior holding structure 130 (not visible in detail) is a series of longitudinally spaced, transversely extending ribs that are constructed and arranged to support the convex side of the blade 16. When viewed from the point of view of FIG. 5 (i.e., on a transversely directed line of sight), the top surfaces (not visible in the FIGS.) of the ribs cooperate to provide a generally downwardly sloped support (in a direction toward the opening 22) for the blade 16; and when viewed from the front, (i.e., on a longitudinally directed line of sight) the top surfaces (not visible in the figures) of each rib of the interior holding structure 130 are transversely spaced in a concave array to receive and support the convex side of the blade.

The ribs can be a plurality of ribs as discussed above, or a single rib. The rib(s) can be formed of a plastic and/or TPE material.

To release the blade 16, the user pulls upwardly on the thumb engaging portion 132 which causes the locking structure 138 on the plastic holding member 126 to move resiliently outwardly and past the locking surface 141 to release the holding member 126 from engagement with a blade 16. The holding member 126 resiliently returns to its normal arcuate shape. It can be appreciated from FIG. 2 that the recess 129 on the free end 128 of the holding member 126 defines two transversely spaced teeth 147 which have spaced arcuate side surfaces 144 sized to conform to the concave surface of the blade 16 to hold the same in locked position.

It can be understood that the use of the holding member 126 when a measurement is being taken is optional. When taking a measurement, the user typically holds the housing assembly 12 in one hand and manually pulls the blade 16 out of the housing assembly 12 with the other hand. When a sufficient length of blade 16 has been withdrawn from the housing assembly 12, the user can lock the blade 16 with respect to the housing assembly 12 using the holding member 126 to prevent the blade 16 from retracting back into the housing assembly 12 (under the spring force of spring 32) when the user releases the blade 16. When the measurement has been taken, the user simply releases the holding member 126 from holding engagement with the blade 16 by moving the free end 128 thereof out of wedging engagement with the blade 16 in the manner described above. If the holding member 126 is not used during the taking of a measurement, the user can simply hold the blade 16 with his other hand while the measurement is being taken or, alternatively, the hook member 34 can be placed in hooking engagement with the workpiece to hold the blade 16 outwardly of the housing assembly 12 in a controlled and steady manner against the spring force of spring 32 while the measurement is being taken.

When the blade 16 is released after taking the measurement, the spring 32 rotates the reel 14 with respect to the housing assembly 12 in a blade-winding direction to wind the blade 16 around the reel 14.

Figure 9A:
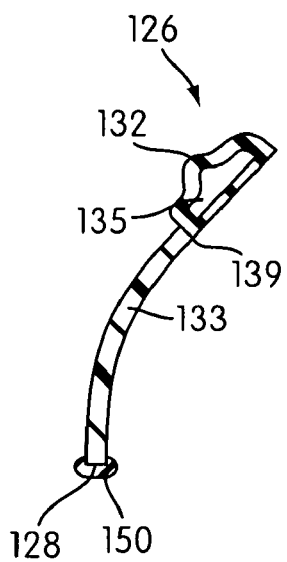
FIG. 9a-d are additional embodiments of holding members, with a resilient portion disposed at the free end thereof.
Figure 9B:
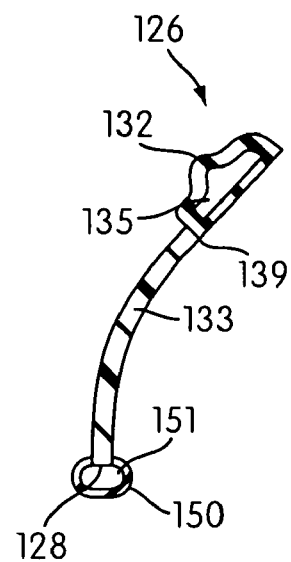
Figure 9C:
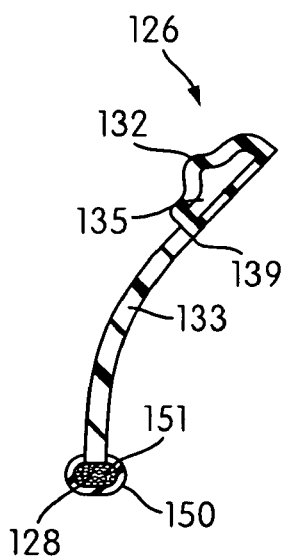
Figure 9D:
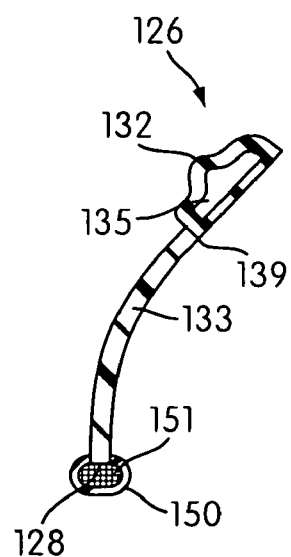

In one embodiment, the holding member 126 has a resilient portion 150 that comprises a blade engaging surface. The resilient portion 150 is attached to the free end 128 of the holding member 126, as seen in FIG. 9a. In one embodiment, the resilient portion 150 is made of an elastomeric material. In another embodiment, as shown in FIGS. 9b-9d, the resilient portion 150 has a void receiving portion 151 behind or within the resilient portion 150 that enables the resilient portion 150 to deform elastically to a greater extent, in comparison with no receiving portion, when the resilient portion 150 contacts the blade 16. Either arrangement provides for enhanced holding force applied to the blade 16 in comparison with no resilient portion. In one embodiment, the receiving portion 151 at the free end 128 of the holding member 126 is comprised of a void, as seen in FIG. 9b. In one embodiment, the receiving region 151 at the free end 128 of the holding member 126 is not a void, but rather comprises a cellular material (FIG. 9c), or a foam or gel (FIG. 9d). These materials are of a lower durometer, or more compliant material than the resilient portion 150. In one embodiment, the receiving region material is chemically compatible with the resilient portion so as to facilitate overmolding and chemical bonding therebetween. For example, the receiving region material 151 can be a foamed version of the same material as the non-foamed resilient portion 150.

Figure 5B:
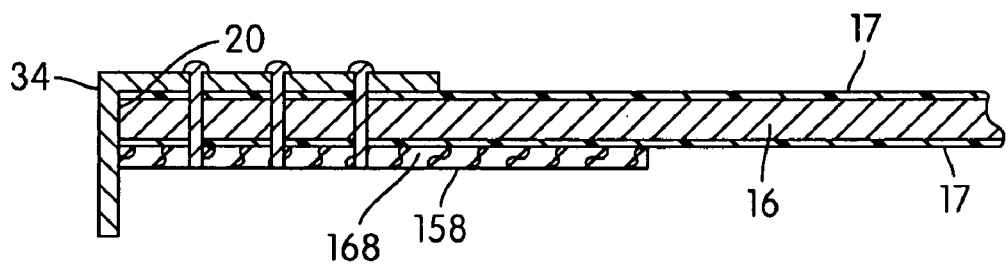
Figure 5C:
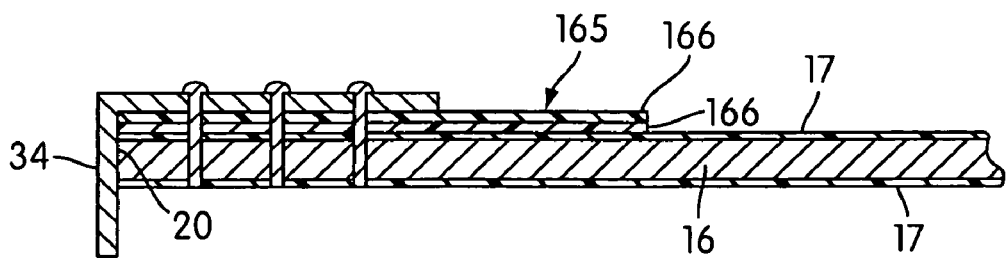

In one embodiment, a relatively short free end portion of the blade 16 has a film 158 of a clear, translucent (as defined herein) plastic material adhered to the concave and/or to the convex side thereof to protect the blade 16 while the same is out of the housing assembly 12 and while the blade 16 is being retracted under the spring force of the spring 32 back into the housing assembly 12. Though the film 158 may be clear to permit reading of measuring indicia beneath the film, it may also be opaque, particularly in the case where it is on the convex side of the blade 16 as shown in FIG. 5b. Moreover, if an opaque film 158 is used on the concave side of the blade, it may itself contain the measuring indicia for that portion of the blade, so that even if the film obscures printed indicia on the blade 16, the device can still be readily used. Preferably the film 158 is made of polyurethane and is adhered to the blade (i.e., over the paint layer), or, in the case that the blade includes a protective plastic coating 17, to the coating 17, by an acrylic adhesive. Adhesive may not be necessary if the plastic coating is made of the same material as the film, since the two components can chemically bond, for example under heat treatment, obviating the need for adhesive. It is also contemplated to use Mylar® or Nylon® to construct the film. The film 158 has a thickness dimension that is larger than the thickness dimension of the thin plastic coating 17, if coating 17 is provided. In one embodiment, the film 158 has a thickness within the range of approximately 0.006 inches to approximately 0.014 inches. It is within the scope of the invention to apply this film to the blade of any known tape rule assembly.

In one embodiment, the film 158 is self-adhering and is placed over several leading inches (preferably within a broad range of approximately 2 inches to approximately 12 inches) of the free end 20 of the blade 16, including the portion of the blade on which the hook member 34 is disposed so that the film goes under the hook member 34 all the way to the free end 20 of the blade 16. In another embodiment, the film 158 is applied along a length from the free end 20 of the blade 16 that is less than 10.5 inches; and in another embodiment, the length of the blade 16 from the free end thereof that is covered by the film 158 is approximately 6 inches. In one embodiment, the film-covered portion end at approximately the point on the blade 16 where the volutes of the coiled blade are in overlying relation to one another when the blade 16 is in its fully retracted configuration. Typically in a tape rule assembly, the tape blade starts to wrap on itself at approximately 9.5 inches when a typical reel size of approximately 2.9 inches in outer diameter is used in the construction. The film 158 is provided because most failures in a rule blade 16 occur within the first six inches of the free end of the blade 16 from cracks or tearing. The cracks or tearing occur because when the blade is wound back around reel under the spring force of the coil spring, the free end of the blade tends to "whip" as it enters the opening 22, causing the last several inches of the blade 16 to hit against the housing assembly 12. This can cause cracking or breaking of the free end of the blade 16 over time. The protective film 158 prevents these cracks and tears and other damage to the blade 16 associated with blade whipping.

The free end of the blade 16 is frequently handled by the user and this handling can over time cause the numbering and markings on the concave side of the blade 16 to wear off or become difficult to read, even where the protective coating 17 is applied. When applied to the concave side of the blade, the film 158 prevents this damage because it covers the numbering and markings on the free end of the blade and thereby protects the same from being worn off. Film 158 provided on the concave side of the blade may also be subjected to less wear in comparison to film provided on the convex side.

There are several possibilities for the protective film 158 that remain within the scope of the present invention. For example, the film 158 may cover only a portion of the width of the blade 16. A range of between about 25% to about 100% may be sufficient to provide an increase in the blade life while reducing the amount of material necessary to provide the film. Most preferably, however, about 100% of the blade width is covered. In addition, the film, illustrated in FIG. 5c as film 165, may include a plurality of sub-layers 166. The sub-layers may be formed into the film prior to attachment to the blade 16, or may alternatively be individually attached to the blade in an iterative process. Also, the film 158, 165 may include at least one reinforcing member; such as, wherein the reinforcing member is a fiber 168 as in FIG. 5*b*.

In one embodiment, the film 158 and/or film 165 (or one or more sub-layer 166 thereof), in any of the embodiments above, may be provided with a fluorescent additive, so as to provide similar benefits (for portions of the blade with such film) noted-above with respect to the coating 17, irrespective of whether the coating 17 is provided with the fluorescent additive. In yet another embodiment, a translucent (as defined herein) fluorescent coating layer is provided as a separate layer positioned between a non-fluorescent coating layer 17 and a non-fluorescent protective film 158 and/or 165. This separate layer may be formed from polyester in one embodiment, with the fluorescent additive.

In other embodiments, indicia are formed on top of the translucent fluorescent coating in any of the previously disclosed embodiments, rather than therebeneath. In another embodiment, the indicia is formed on top of an opaque, plastic coating layer formed on top of the metal blade.

In any of the embodiments herein, the fluorescent dye may provide a yellowish, greenish, orangeish or other colored tint.

In yet other embodiments, rather than using a fluorescent additive as described above, a light energy absorbing and releasing material (or "luminescent" or "phosphorescent material") is used. Such material is capable of subsequently releasing and emitting light energy to provide illumination to the measuring indicia in unlit environmental conditions. Unlike fluorescent materials, phosphorescent materials do not immediately discharge the radiation it absorbs. This type of light energy absorbing and releasing (or phosphorescent) material is commonly referred to as "glow-in-the-dark" material. Thus, in the embodiments described above, the layer 17 and/or layer 158 may include a "glow-in-the-dark" substance. In one configuration, the "glow-in-the-dark" layer 17 is substantially translucent (as defined herein) and illuminates the indicia printed therebeneath to enable the indicia to be viewed in unlit environmental conditions.

In another modification, the "glow-in-the-dark" material layer 17 is substantially opaque. In this modification, the indicia is a non-phosphorescent material (e.g., conventional measuring tape paint, or a fluorescent material such as fluorescent paint) printed on top of the layer 17, and the glow of the layer 17 will provide substantial contrast to the indicia printed thereon in unlit conditions.

In this last configuration, a thin translucent or transparent layer or coating may be provided on top of the "glow-in-the-dark" material and the indicia. This thin clear or translucent layer may be similar to the layer 17 as described in U.S. Pat. No. 6,804,899, or as described above, and protects the indicia from becoming worn or faded.

In yet another embodiment, a "glow-in-the-dark" (phosphorescent) material is used for the indicia (lines and/or numbers), and this is formed on a non-phosphorescent background material (e.g., a background of conventional paint, or fluorescent material). In this embodiment, the glow of the indicia will provide substantial contrast in relation to the background material on which the indicia is formed, particularly in unlit conditions.

In yet another embodiment, the "glow-in-the-dark" material comprises an opaque "glow-in-the-dark" plastic material that constitutes essentially the entire thickness of the blade 16, thus eliminating the need for a metal layer. The indicia in this embodiment is printed directly on the top surface of the plastic blade 16.

The "glow-in-the-dark" or phosphorescent material may be any suitable type of chemical compound emitting light, such as zinc sulfide or strontium aluminate, just for example.

The construction of the hook member 34 and the manner in which it is disposed on the free end 20 of the blade 16 is best seen in FIGS. 1-4. Preferably the end hook member 34 is formed of sheet metal and is mounted on the free end 20 of the blade 16.

One skilled in the art will understand that the embodiment of the tape rule assembly 10 shown in the figures and described above is exemplary only and not intended to be limiting. It is within the scope of the invention to provide any known tape rule assembly with any or all of the features of the present invention. For example, the clear film of plastic material with fluorescent dye can be applied to any known tape rule assembly, such a dual mode rule assembly as disclosed by U.S. Pat. No. 6,643,948, hereby incorporated by reference in its entirety, or a "Lever Lock" type tape rule. It should be appreciated that the "blade holding assembly" as disclosed and claimed herein can be any type of blade holding assembly, including the dual mode type or "Lever Lock" type. Similarly, a lock member constructed according to the principles of the present invention can be applied to any known rule assembly.

It can also be appreciated that it is contemplated to use any of the aforementioned features singly or in any appropriate combination on a tape rule assembly that has a spring-powered retractable blade or, alternatively, on any tape rule assembly in which the blade is manually retracted.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A retractable rule assembly, comprising:
a housing assembly;
a reel rotatably mounted in said housing assembly;
an elongated blade formed of a ribbon of metal being wound on the reel, said elongated blade having measuring indicia formed on a concave side thereof;
a coil spring formed of a ribbon of metal constructed to rotate said reel in said housing assembly in a direction to wind up the elongated blade; and
a blade holding assembly for holding the blade in a position of extension outwardly of said housing, said blade holding assembly comprising a resilient thumb engaging portion and a receiving region behind the thumb engaging portion to enable the thumb engaging portion to deform into the receiving region to absorb impact.

2. A retractable rule assembly according to claim 1, wherein the resilient thumb engaging portion comprises an elastomeric material, and the receiving region comprises a void.

3. A retractable rule assembly according to claim 2, wherein the blade holding assembly further comprises a body portion comprising a plastic material, the body portion being joined to the thumb engaging portion.

4. A retractable rule assembly according to claim 3, wherein the body portion comprises an arcuate portion terminating in a free end for engaging the blade.

5. A retractable rule assembly according to claim 4, wherein the body portion further comprises an outwardly extending portion and a mounting portion, the thumb engaging portion being mounted on the mounting portion.

6. A retractable rule assembly according to claim 1, wherein the resilient thumb engaging portion is fastened to the blade holding assembly by a chemical or adhesive bond.

7. A retractable rule assembly according to claim 1, wherein the resilient thumb engaging portion comprises an elastomeric material, and the receiving region comprises a material of a lower durometer than a durometer of the thumb engaging portion.

8. A retractable rule assembly according to claim 1, wherein the resilient thumb engaging portion is fastened to the blade holding assembly by a mechanical bond.

9. A retractable rule assembly according to claim 1, wherein the thumb engaging portion deforms a distance that is greater than 50% of the cross-sectional thickness thereof, wherein the thickness is measured at a region of maximum cross-sectional thickness at a region of the thumb engaging portion that deforms towards the receiving region.

10. A blade locking structure for a rule assembly, comprising:
- a generally arcuate body portion comprising a plastic material; and
- a thumb engaging portion joined with said body portion, said thumb engaging portion comprising an elastomeric material, and a receiving region behind the thumb engaging portion to enable the thumb engaging portion to deform into the receiving region to absorb impact upon the thumb engaging region.

11. A blade locking structure according to claim 10, wherein the receiving region is between the thumb engaging portion and the plastic material.

12. A blade locking structure according to claim 11, wherein the receiving region is entirely within the elastomeric material of the thumb engaging portion.

13. A blade locking structure according to claim 11, wherein the receiving region is in direct communication with the plastic material.

14. A blade locking structure according to claim 11, wherein the receiving region is filled with a lower durometer material in comparison with a durometer of the thumb engaging portion.

15. A blade locking structure according to claim 11, wherein a material forming the receiving region is of a different color than that of the thumb engaging portion.

16. A blade locking structure according to claim 11, wherein the receiving region comprises a cellular structure.

17. A blade locking structure according to claim 16, wherein the cellular structure is comprised of a different material than that of the thumb engaging portion.

18. A blade locking structure according to claim 10, wherein the receiving region is a void.

19. A blade locking structure according to claim 18, wherein the void is a thru void.

20. A blade locking structure according to claim 10, wherein the receiving region comprises a plurality of voids.

21. A blade locking structure according to claim 10, wherein an exterior surface portion of the thumb engaging portion is perforated.

22. A blade locking structure according to claim 10, wherein an exterior surface portion of the thumb engaging portion has recessed grooves.

23. A blade locking structure according to claim 10, wherein an exterior surface portion of the thumb engaging portion has a plurality of protrusions.

24. A blade locking structure according to claim 10, wherein an exterior surface portion of the thumb engaging portion has a combination of protruding and recessed grooves.

25. A blade locking structure according to claim 10, wherein the thumb engaging portion has a non-constant cross-sectional thickness.

26. A blade locking structure according to claim 10, wherein the thumb engaging portion deforms a distance that is greater than 50% of the cross-sectional thickness thereof, wherein the thickness is measured at a region of maximum cross-sectional thickness at a region of the thumb engaging portion that deforms towards the receiving region.

27. A retractable rule assembly, comprising:
- a housing assembly;
- a reel rotatably mounted in said housing assembly;
- an elongated blade formed of metal being wound on the reel, said elongated blade having measuring indicia formed on a concave side thereof;
- a coil spring formed of metal constructed to rotate said reel in said housing assembly in a direction to wind up the elongated blade; and
- a blade holding assembly for holding the blade in a position of extension outwardly of said housing, said blade holding assembly comprising a thumb engaging portion and a blade engaging portion, said blade engaging portion comprising a resilient structure at a free end thereof for engaging the blade, wherein the resilient structure comprises a resilient outer material and a receiving region behind the resilient outer material, the resilient outer material being deformable into the receiving region.

28. A retractable rule assembly according to claim 27, wherein the receiving region comprises a void.

29. A retractable rule assembly according to claim 27, wherein the receiving region comprises a material of a lower durometer than the resilient outer material.

30. A retractable rule assembly according to claim 27, wherein the thumb engaging portion deforms a distance that is greater than 50% of the cross-sectional thickness thereof, wherein the thickness is measured at a region of maximum cross-sectional thickness at a region of the thumb engaging portion that deforms towards the receiving region.

* * * * *